(12) United States Patent
Amirkiai et al.

(10) Patent No.: US 9,772,467 B2
(45) Date of Patent: Sep. 26, 2017

(54) HERMETICALLY SEALING AN OPTICAL SUBASSEMBLY

(71) Applicant: FINISAR CORPORATION, Sunnyvale, CA (US)

(72) Inventors: Maziar Amirkiai, Sunnyvale, CA (US); Hongyu Deng, Saratoga, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 157 days.

(21) Appl. No.: 14/487,310

(22) Filed: Sep. 16, 2014

(65) Prior Publication Data

US 2016/0077302 A1   Mar. 17, 2016

(51) Int. Cl.
| | |
|---|---|
| *G02B 7/02* | (2006.01) |
| *B23K 26/24* | (2014.01) |
| *B23K 11/08* | (2006.01) |
| *B23K 31/02* | (2006.01) |
| *G02B 6/42* | (2006.01) |

(52) U.S. Cl.
CPC ............... *G02B 7/02* (2013.01); *B23K 11/08* (2013.01); *B23K 26/24* (2013.01); *B23K 31/02* (2013.01); *G02B 6/4201* (2013.01)

(58) Field of Classification Search
CPC ........ G02B 7/02; G02B 7/025; G02B 6/0086; G02B 6/4201; G02B 6/4261; G02B 6/4263; G02B 6/4251; G02B 6/4219; G02B 6/4256; G02B 7/18
USPC ........................ 359/819, 830; 385/92–94, 88
See application file for complete search history.

(56) References Cited

U.S. PATENT DOCUMENTS

| | | | | |
|---|---|---|---|---|
| 6,659,657 | B2* | 12/2003 | Lin ..................... | G02B 6/4202 385/76 |
| 7,354,201 | B2* | 4/2008 | Aronson ............. | G02B 6/4207 385/78 |
| 7,476,040 | B2* | 1/2009 | Zack ................... | G02B 6/4201 385/93 |
| 7,491,001 | B2* | 2/2009 | Lim .................... | G02B 6/4204 385/33 |
| 7,802,929 | B2* | 9/2010 | Moore ................ | G02B 6/4201 385/88 |

* cited by examiner

*Primary Examiner* — Scott J Sugarman
*Assistant Examiner* — Kristina Deherrera
(74) *Attorney, Agent, or Firm* — Maschoff Brennan

(57) ABSTRACT

A method may include selecting a transistor-outline can (TO-can) assembly cap. The method may further include welding the TO-can assembly cap to a rim that surrounds an optical opening of an optical subassembly box (OSA) such that the TO-can assembly cap hermetically seals the optical opening and allows optical signals to pass through the TO-can assembly cap and the optical opening.

19 Claims, 6 Drawing Sheets

HERMETICALLY SEALING AN OPTICAL SUBASSEMBLY

BACKGROUND

Optical subassemblies (OSAs) such as transmitting OSAs (TOSAs) and receiving OSAs (ROSAs) may include various components that may be hermetically sealed within an enclosure to allow for proper operation and to increase the longevity of the components. The monetary expense of some traditional methods of accomplishing the hermetic sealing of some types of OSAs is fairly high.

For example, an OSA box may have an optical opening that may be traditionally hermetically sealed with a metalized optical medium (e.g., metalized glass or metalized sapphire) that may be soldered or brazed to a rim surrounding the optical opening. The metalized optical medium may contribute a substantial amount of cost to the OSA box.

SUMMARY

According to an aspect of an embodiment, an optical subassembly (OSA) box is configured to include components of a transmitting optical subassembly (TOSA) or a receiving optical subassembly (ROSA). The OSA box may include an electrical interface configured to carry electrical signals to one or more electrical components of a TOSA or a ROSA. The OSA box may further include an optical opening configured to allow optical signals to enter or leave the OSA box. Additionally, the OSA box may include a rim surrounding the optical opening. The OSA box may also include a transistor-outline can (TO-can) assembly cap welded to the rim surrounding the optical opening such that the TO-can assembly cap hermetically seals the optical opening and allows optical signals to pass through the optical opening via the TO-can assembly cap.

According to another aspect of an embodiment, a transistor-outline can (TO-can) assembly cap may include a tubular portion including a first cross-sectional area, a lens disposed inside of the tubular portion, and a flange portion disposed at an end of the tubular portion. The flange portion may include a second cross-sectional area greater than the first cross-sectional area. The flange portion may also include a proximal side facing in a direction of an extension of the tubular portion away from the flange portion. The proximal side may include a welding concentrator such that the proximal side is configured to be welded to a surface.

According to another aspect of an embodiment, a method may include selecting a transistor-outline can (TO-can) assembly cap. The method may further include welding the TO-can assembly cap to a rim that surrounds an optical opening of an optical subassembly box (OSA) such that the TO-can assembly cap hermetically seals the optical opening and allows optical signals to pass through the TO-can assembly cap and the optical opening.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Optical subassembly (OSA) boxes may be used to house components that may be used for transmitting and/or receiving optical signals. As such, OSA boxes may include an optical opening that may allow optical signals to pass into or out of the OSA boxes. OSA boxes may also be hermetically sealed to help improve the accuracy and/or longevity of the components that may be housed inside. The hermetic sealing may include hermetically sealing the optical opening in a manner that seals the optical opening but also allows signals to pass through the optical opening. A common technique for hermetically sealing optical openings is to use a metalized optical medium (metalized glass or metalized sapphire) that covers the optical openings.

Metalized optical mediums may include a metalized portion that may be included toward the outer portion of the metalized optical mediums. The metalized portion may allow for the metalized optical mediums to be welded to a rim surrounding the optical opening of a corresponding OSA box in a manner that hermetically seals the optical opening. A non-metalized portion of the metalized optical mediums may allow the optical signals to pass through the optical opening. The process used to create the metalized portions of metalized optical mediums may be relatively complicated and expensive. As such, metalized optical mediums contribute to a substantial amount of the cost of traditionally produced OSA boxes.

As described in detail below, according to some embodiments of the present disclosure, a transistor-outline can (TO-can) assembly cap may be used instead of a metalized optical medium to hermetically seal an optical opening of an OSA box. The TO-can assembly cap may have a lower cost than most if not all metalized optical media. Therefore, hermetically sealing the OSA box with the TO-can assembly cap may reduce the cost of the OSA box as compared to OSA boxes that are hermetically sealed with a metalized optical medium.

Reference will now be made to the drawings to describe various aspects of some example embodiments. It is to be understood that the drawings are diagrammatic and schematic representations of such example embodiments, and are not limiting, nor are they necessarily drawn to scale.

Figure 1A:
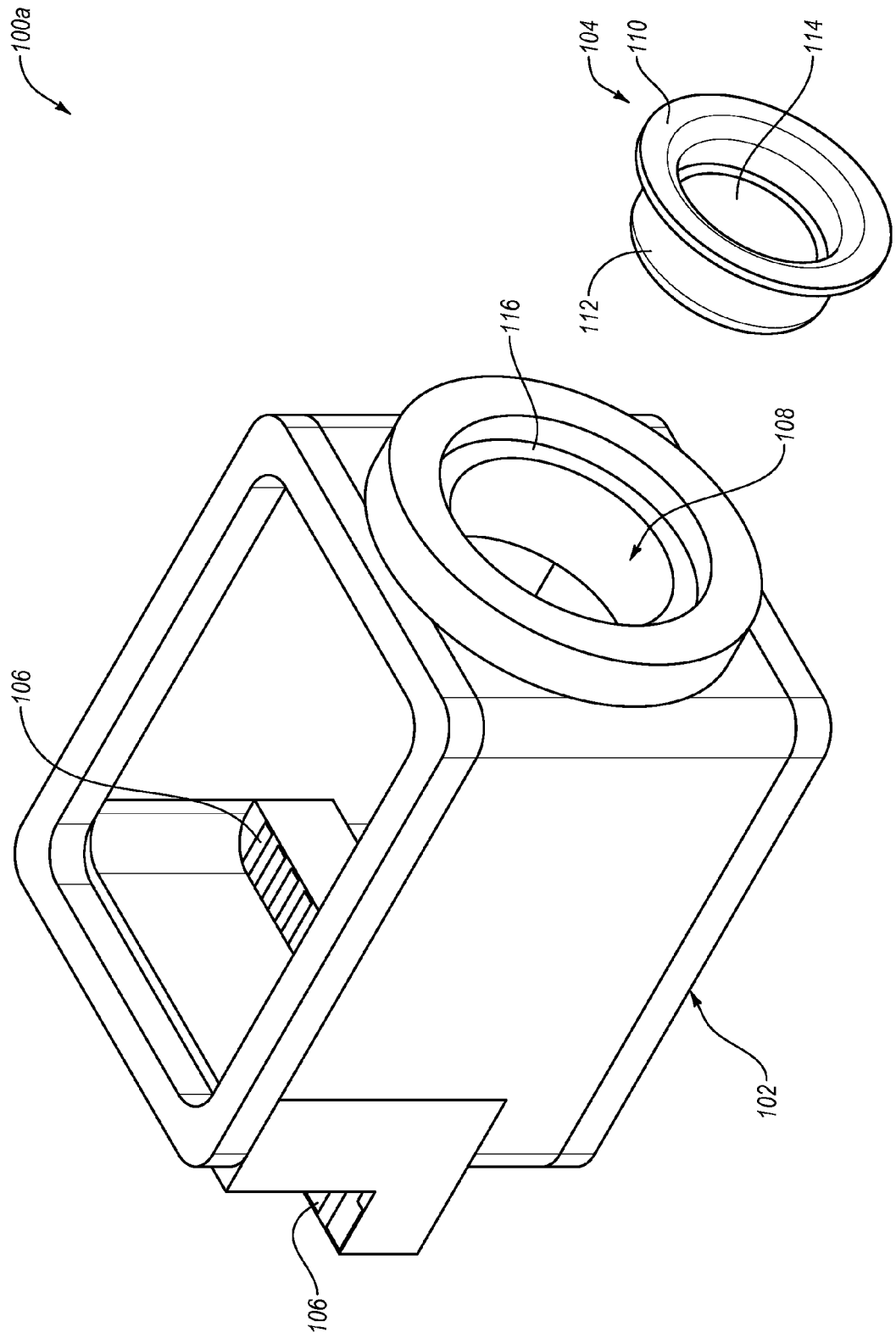
FIG. 1A illustrates an exploded view of an example OSA box.
Figure 1B:
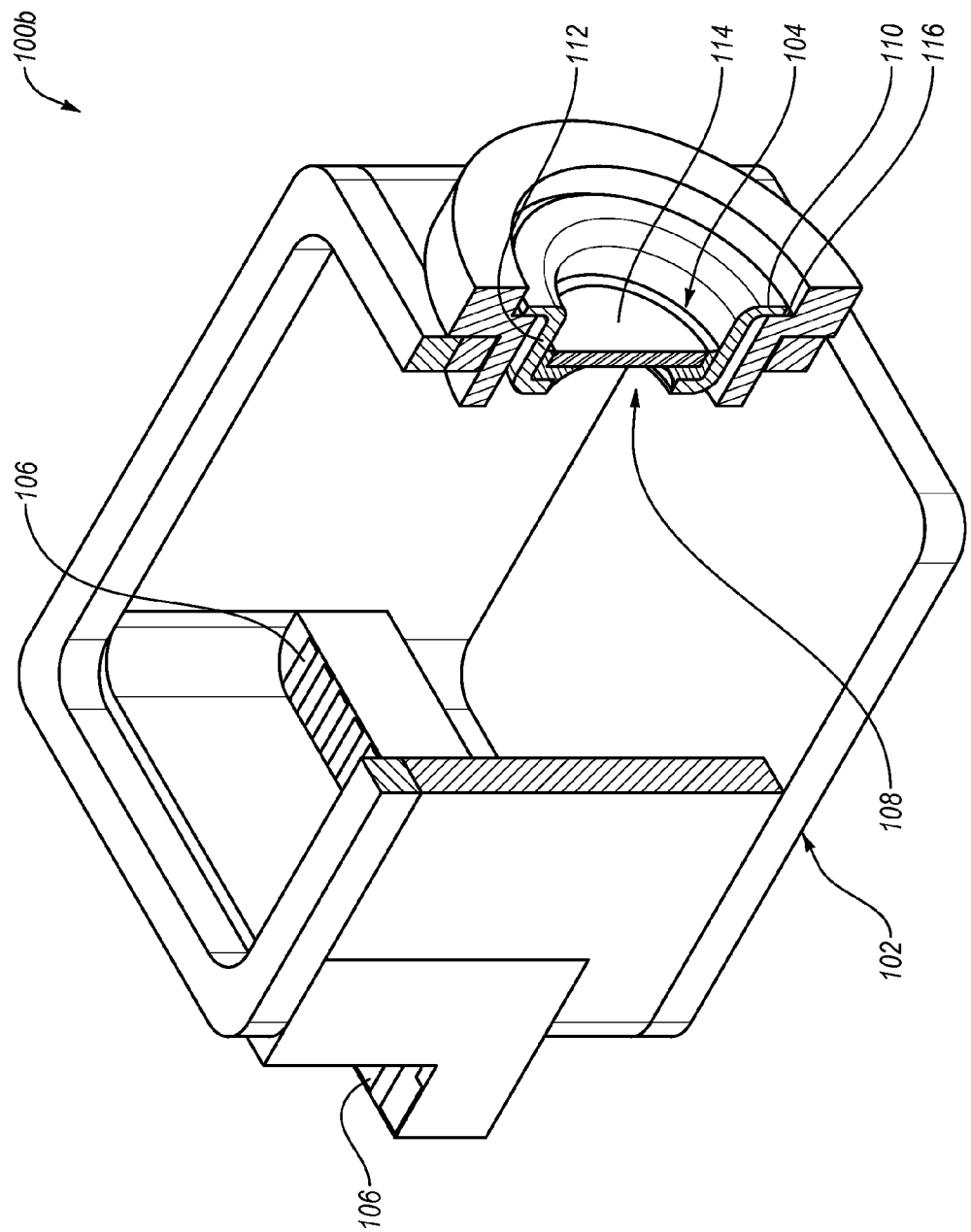
FIG. 1B illustrates a quarter cross-sectional view of the OSA box of FIG. 1A.

FIG. 1A illustrates an exploded view 100a of an example OSA box 102 that may have an optical opening 108 hermetically sealed with a TO-can assembly cap 104, according to at least one embodiment described herein. FIG. 1B illustrates a quarter cross-sectional view 100b of the OSA box 102 with the TO-can assembly cap 104 hermetically sealing the optical opening 108, according to at least one embodiment described herein. In the illustrated example, the optical opening 108 is illustrated as having a substantially circular shape. However, the optical opening may have any other suitable shape such as a triangular, rectangular, hexagonal, pentagonal, octagonal, etc., shape.

In some embodiments, the OSA box 102 may include components associated with transmitting an optical signal such that the OSA box 102 may be used for a transmitting OSA (TOSA). In other embodiments, the OSA box 102 may include components associated with receiving an optical signal such that the OSA box 102 may be used for a receiving OSA (ROSA).

In particular, when the OSA box 102 is used for a TOSA, the OSA box 102 may include one or more components that may be configured to receive electrical signals via an electrical interface 106 of the OSA box, to convert the electrical signals to optical signals, and to emit the optical signals out of the optical opening 108. For example, when the OSA box 102 is used for a TOSA, the OSA box 102 may include a laser module configured to receive the electrical signals, to convert the electrical signals to optical signals, and to emit the optical signals in a beam of light.

When the OSA box 102 is used for a ROSA, the OSA box 102 may include one or more components configured to receive optical signals via the optical opening 108 and convert the received optical signals to electrical signals, which may be communicated to components external to the OSA box 102 via the electrical interface 106. For example, when the OSA box 102 is used for a ROSA, the OSA box 102 may include a receiver module that includes one or more photodiodes configured to receive the optical signals and convert the optical signals to electrical signals, which may then be communicated to the electrical interface 106.

The TO-can assembly cap 104 may be configured to interface with the optical opening 108 such that the TO-can assembly cap 104 may hermetically seal the optical opening 108. Specifically, the TO-can assembly cap 104 may include a flange portion 110, a tubular portion 112, and a lens 114. The tubular portion 112 may be a tubular component of any appropriate shape or size. For example, in the illustrated example, the tubular portion 112 may be substantially cylindrical. However, in other embodiments, the tubular portion 112 may be substantially triangular, rectangular, pentagonal, hexagonal, octogonal, or any other appropriate shape. Additionally, the tubular portion 112 may be at least partially hollow.

The tubular portion 112 may be shaped and sized such that the tubular portion 112 may be disposed inside of the optical opening 108. For example, the tubular portion 112 may be shaped substantially the same as the optical opening and may have a first cross-sectional area that may be sized such that the tubular portion 112 may be disposed inside of the optical opening 108. In particular, in the illustrated embodiment, the tubular portion 112 may be cylindrical based on the optical opening 108 being substantially circular in the illustrated embodiment. Further, the tubular portion 112 may have a first diameter (which may dictate the cross-sectional area of the tubular portion 112) that may be sized and shaped such that the tubular portion 112 may be disposed inside of the optical opening 108, for example, as illustrated in FIG. 1B.

The lens 114 may be hermetically sealed and disposed inside of the hollow portion of the tubular portion 112. The lens 114 may be made of any suitable optical medium that may allow optical signals of at least some wavelengths to pass through it. Therefore, the optical signals may pass through the optical opening 108 of the OSA box 102 via the lens 114 when the tubular portion 112 of the TO-can assembly cap 104 is disposed in the optical opening 108.

Further, the lens 114 may be sized and shaped such that it may be disposed inside of the hollow portion of the tubular portion 112.

The flange portion 110 may be disposed at an end of the tubular portion 112 and may have a second cross-sectional area that is larger than the first cross-sectional area of the tubular portion 112. For example, in the illustrated embodiment, the flange portion 110 may have a second diameter that is larger than the first diameter of the tubular portion 112. The second cross-sectional area may be sized and/or shaped based on the optical opening 108 such that the flange portion 110 may be too big to fit inside of or pass through the optical opening 108. Additionally, the second cross-sectional area may be sized and shaped based on an outside rim 116 of the optical opening such that the flange portion 110 may fit against the outside rim 116, for example, such as illustrated in FIG. 1B.

The flange portion 110 may include a proximal side that may face in a direction that follows an extension of the tubular portion 112 from the flange portion 110. The flange portion 110 may also include a distal side that is opposite the proximal side.

By being sized to fit against the outside rim 116, the flange portion 110 may be configured such that it may be welded to the outside rim 116. The welding of the flange portion 110 to the outside rim 116 may create a hermetic seal between the flange portion 110 and the outside rim 116. In the illustrated embodiment, the proximal side of the flange portion 110 may be welded to the outside rim 116. Therefore, the TO-can assembly cap 104 may hermetically seal the optical opening 108 via the weld between the proximal side of the flange portion 110 and the outside rim 116. The flange portion 110 may be welded to the outside rim 116 using any suitable welding technique or type such as, for example, using resistive or laser welding.

Figure 2:
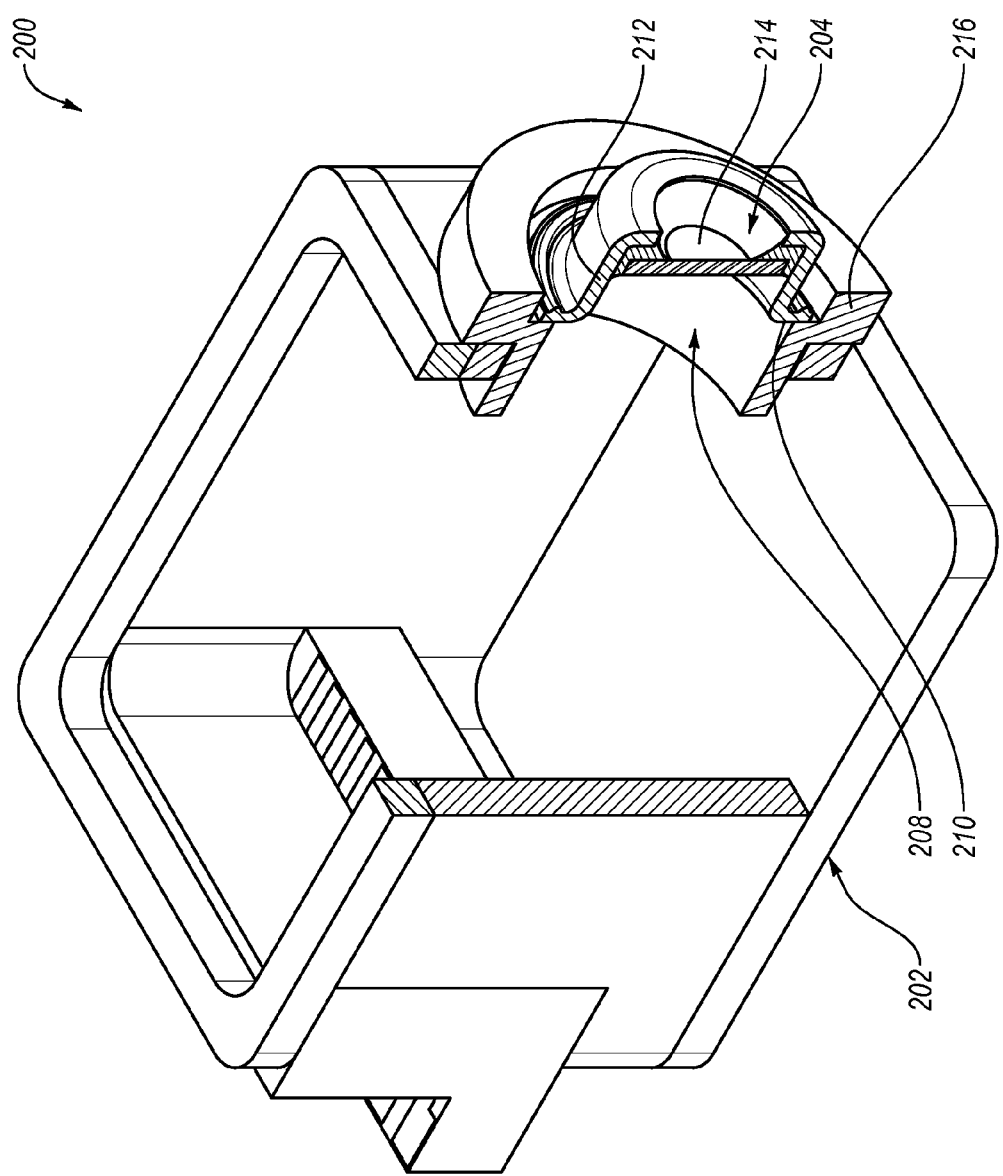
FIG. 2 illustrates a quarter cross-sectional view of another example OSA box.

The configuration of the OSA box 102 with respect to the TO-can assembly cap 104 of FIGS. 1A and 1B is merely an example and is not limiting. For example, FIG. 2 illustrates a quarter cross-sectional view 200 of an OSA box 202 with a TO-can assembly cap 204 hermetically sealing an optical opening 208, according to at least one embodiment described herein. The optical opening 208 may be analogous to the optical opening 108 of FIGS. 1A and 1B. Additionally, the OSA box 202 may include an outside rim 216 that may be analogous to the outside rim 116 of FIGS. 1A and 1B.

The TO-can assembly cap 204 may be configured to interface with the optical opening 208 such that the TO-can assembly cap 204 may hermetically seal the optical opening 208. Specifically, the TO-can assembly cap 204 may include a flange portion 210, a tubular portion 212, and a lens 214 analogous to the flange portion 110, the tubular portion 112, and the lens 114 of the OSA box 102 of FIGS. 1A and 1B.

The flange portion 210 may include a proximal side similar to the proximal side of the flange portion 110 as well as a distal side that is opposite the proximal side. In the illustrated embodiment, the distal side of the flange portion 210 may be welded to the outside rim 216, as illustrated. Therefore, the OSA box 202 may be configured such that the TO-can assembly cap 204 may hermetically seal the optical opening 208 via a weld between the distal side of the flange portion 210 and the outside rim 216. In contrast, in the illustrated example of FIGS. 1A and 1B, the proximal side of the flange portion 110 may be welded to the outside rim 116.

Figure 3:
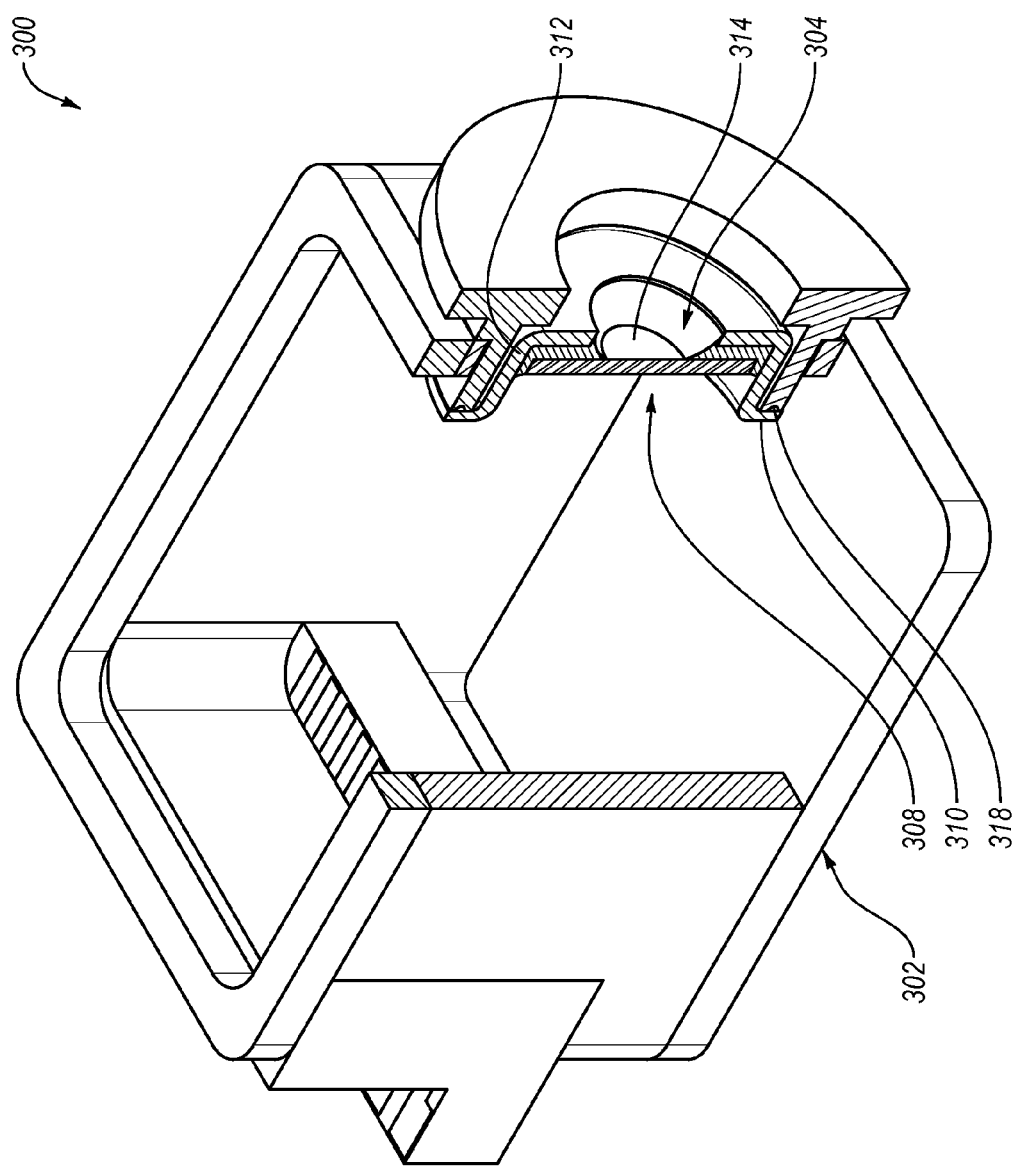
FIG. 3 illustrates a quarter cross-sectional view of another example OSA box.

FIG. 3 illustrates a quarter cross-sectional view 300 of an OSA box 302 with a TO-can assembly cap 304 hermetically sealing an optical opening 308, according to at least one embodiment described herein.

Similar to the TO-can assembly cap 104, the TO-can assembly cap 304 may be configured to interface with the optical opening 308 such that the TO-can assembly cap 304 may hermetically seal the optical opening 308. Specifically, the TO-can assembly cap 304 may include a flange portion 310, a tubular portion 312, and a lens 314. The tubular portion 312 may have a first cross-sectional area that may be sized and shaped such that the tubular portion 312 may be disposed inside of the optical opening 308. Additionally, the tubular portion 312 may be at least partially hollow.

The lens 314 may be sealed and disposed inside of the hollow portion of the tubular portion 312. The lens 314 may be made of any suitable material and may allow optical signals of at least some wavelengths to pass through it. Therefore, the optical signals may pass through the optical opening 308 of the OSA box 302 via the lens 314 when the tubular portion 312 of the TO-can assembly cap 304 is disposed in the optical opening 308.

The flange portion 310 may be disposed at an end of the tubular portion 312 and may have a second cross-sectional area that is shaped similarly to the tubular portion 312 and that is larger than the first cross-sectional area of the tubular portion 312. The second cross-sectional area may be sized and shaped based on the optical opening 308 such that the flange portion 310 may be too big to fit inside of or pass through the optical opening 308. Additionally, the second cross-sectional area may be sized based on an inside rim 318 of the optical opening 308 such that the flange portion 310 may fit against the inside rim 318.

The flange portion 310 may include a proximal side that is facing in a direction that follows an extension of the tubular portion 312 from the flange portion 310. The flange portion 310 may also include a distal side that is opposite the proximal side.

By being sized to fit against the inside rim 318, the flange portion 310 may be configured such that it may be welded to the inside rim 318. In the illustrated embodiment, the proximal side of the flange portion 310 may be welded to the inside rim 318. The welding of the proximal side of the flange portion 310 to the inside rim 318 may create a hermetic seal between the flange portion 310 and the inside rim 318. Therefore, the TO-can assembly cap 304 may hermetically seal the optical opening 308 via the weld between the flange portion 310 and the inside rim 318. The flange portion 310 may be welded to the inside rim 318 using any suitable welding technique or type such as, for example, using resistive or laser welding.

Therefore, the OSA box 302 may be configured such that the TO-can assembly cap 304 may hermetically seal the optical opening 308 via a weld between the flange portion 310 and the inside rim 318 that faces inside of the OSA box 302. In contrast in FIGS. 1A and 1B, the OSA box 102 may be configured such that the TO-can assembly cap 104 may hermetically seal the optical opening 108 via a weld between the flange portion 110 and the outside rim 116 that faces outside of the OSA box 102.

Figure 4:
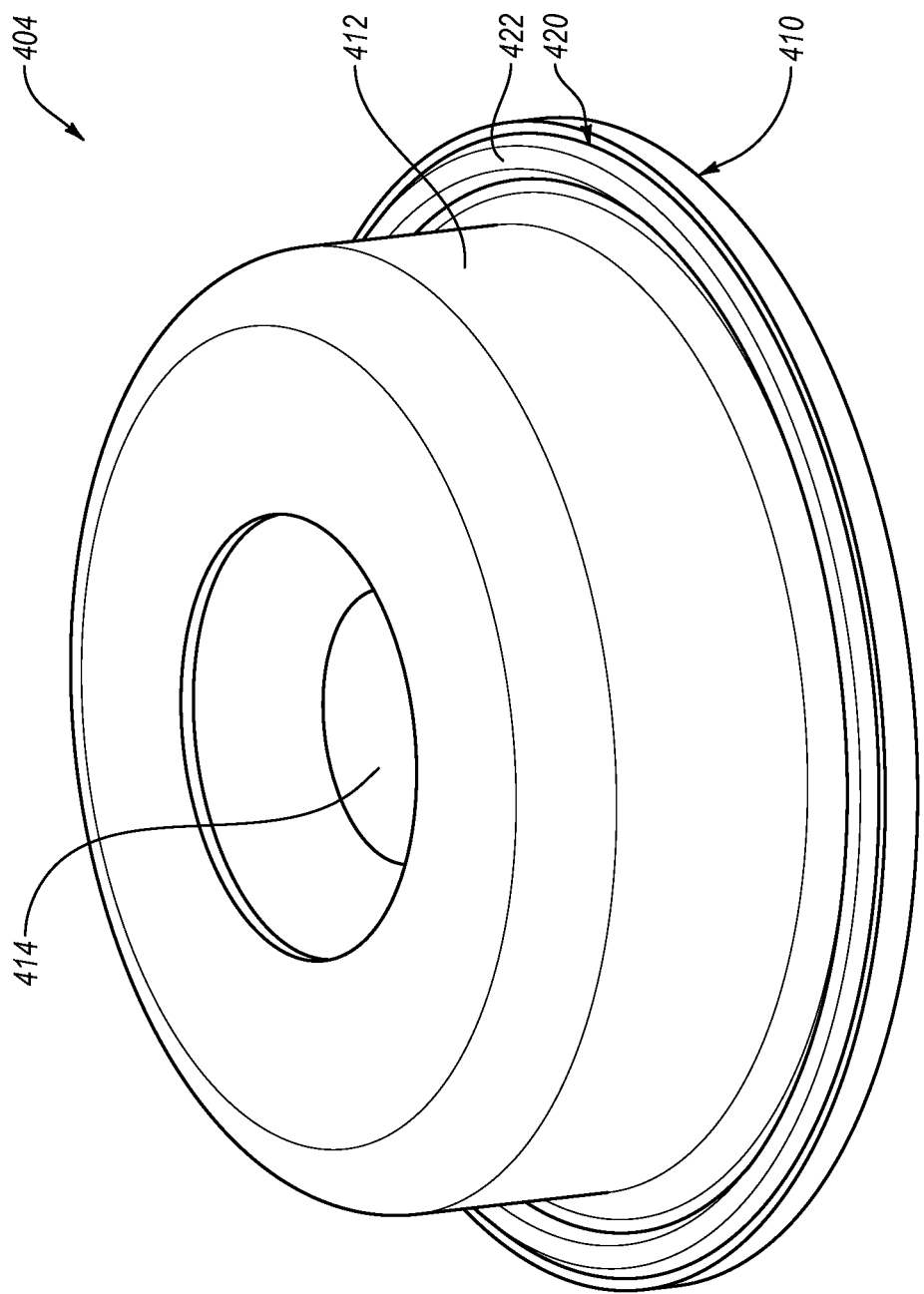
FIG. 4 is an isometric view of an example TO-can assembly cap.

FIG. 4 is an isometric view of a TO-can assembly cap 404 arranged according to at least one embodiment described herein. The TO-can assembly cap 404 may include a flange portion 410, a tubular portion 412, and a lens 414 that may be analogous to the flange portion 110, the tubular portion 112, and the lens 114 of FIGS. 1A and 1B. For example, the tubular portion 412 may have a first cross-sectional area that may be sized and shaped such that the tubular portion 412 may be disposed inside of an optical opening of an OSA box. Additionally, the tubular portion 412 may be at least partially hollow.

Further, the lens 414 may be sealed and disposed inside of the hollow portion of the tubular portion 412. The lens 414 may be made of any suitable optical medium and may allow optical signals of at least some wavelengths to pass through it. Further, the flange portion 410 may be disposed at an end of the tubular portion 412 and may have a second cross-sectional area that is shaped similarly to but larger than the first cross-sectional area of the tubular portion 412. In some embodiments, the second cross-sectional area may be sized and shaped based on the optical opening of a corresponding OSA box such that the flange portion 410 may be too big to fit inside of or pass through the optical opening. Additionally, the second cross-sectional area may be sized based on a rim (e.g., an outside rim or an inside rim) of the optical opening such that the flange portion 410 may fit against the rim.

The flange portion 410 may also include a proximal side 420 that may face in a direction that follows an extension of the tubular portion 412 from the flange portion 410. The flange portion 410 may also include a distal side (not expressly labeled in FIG. 4) that may be opposite the proximal side 420. The proximal side 420 may include a welding concentrator 422 that may be disposed around the flange portion 410 on the proximal side 420. The welding concentrator 422 may be configured such that the proximal side 420 may be welded to another object, such as the rim of an OSA box. The welding concentrator may also be configured such that the weld may create a hermetic seal.

Accordingly, the TO-can assembly cap 404 may be configured in a manner that may allow for the proximal side 420 to be welded to a rim that may surround an optical opening of an OSA box. As such, the TO-can assembly cap 404 may be configured such that it may be used to hermetically seal the optical opening via the weld at the proximal side.

Figure 5:
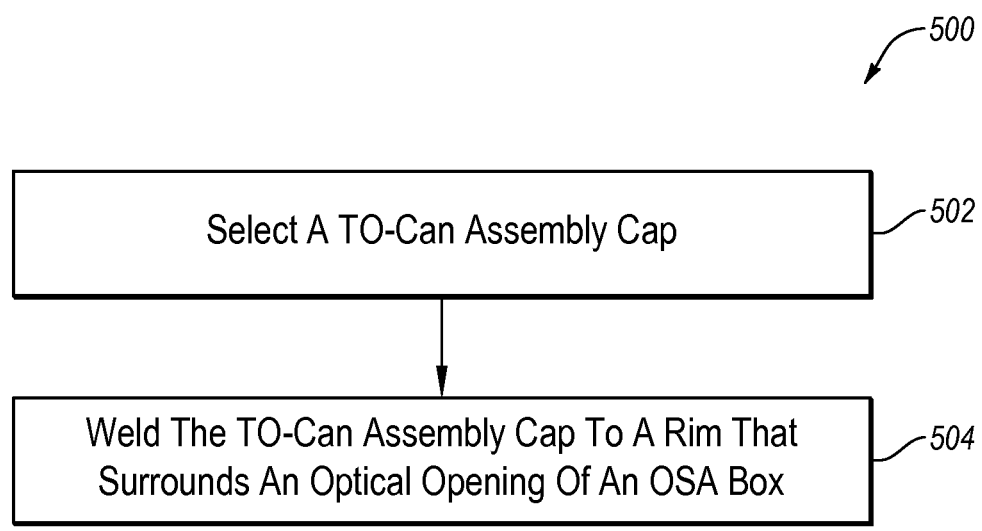
FIG. 5 is a flowchart of an example method of hermetically sealing an OSA box.

FIG. 5 is a flowchart of an example method 500 of hermetically sealing an OSA box, arranged in accordance with at least one embodiment of the present disclosure. The method 500 may be implemented using any applicable manufacturing device or system. Although illustrated as discrete blocks, various blocks may be divided into additional blocks, combined into fewer blocks, or eliminated, depending on the desired implementation.

The method 500 may begin, and at block 502 a TO-can assembly cap may be selected. In some embodiments, the TO-can assembly cap may include a tubular portion having a first cross-sectional area, a lens disposed inside of the tubular portion, and a flange portion disposed at an end of the tubular portion. The flange portion may have a second cross-sectional area that is greater than the first cross-sectional area. The flange portion may also have a proximal side facing in a direction of an extension of the tubular portion away from the flange portion. Further, the flange portion may have a distal side that is opposite the proximal side.

At block 504, the TO-can assembly cap may be welded to a rim that surrounds an optical opening of an OSA box. The welding may be such that the TO-can assembly cap hermetically seals the optical opening and allows optical signals to pass through the TO-can assembly cap and the optical opening. The TO-can assembly cap may be welded to the rim by laser welding, resistive welding, or other suitable welding process or technique.

In some embodiments, the rim may be an outside rim that faces outside of the OSA box and in other embodiments, the rim may be an inside rim that faces inside of the OSA box. Additionally, in some embodiments, the proximal side of the flange portion of the TO-can assembly cap may be welded to the rim such that the tubular portion may be disposed inside the optical opening. In other embodiments, the distal side of the flange portion of the TO-can assembly cap may be welded to the rim such that the tubular portion may be disposed outside the optical opening.

Accordingly, the method 500 may be used to hermetically seal an optical opening of an OSA box. Modifications, additions, or omissions may be made to the method 500 without departing from the scope of the present disclosure. For example, one skilled in the art will appreciate that for the method 500, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure. The example embodiments disclosed herein are to be considered in all respects only as illustrative and not restrictive.

What is claimed is:

1. An optical subassembly (OSA) box comprising:
   an electrical interface configured to carry electrical signals to one or more electrical components of a transmitting optical subassembly (TOSA) or a receiving optical subassembly (ROSA);
   an optical opening configured to allow optical signals to enter or leave the OSA box;
   a rim within the optical opening; and
   a transistor-outline can (TO-can) assembly cap including a flange portion, the TO-can assembly cap at least partially recessed within the rim and the flange portion welded to the rim within the optical opening such that the TO-can assembly cap hermetically seals the optical opening and allows optical signals to pass through the optical opening via the TO-can assembly cap.

2. The OSA box of claim 1, wherein the TO-can assembly cap comprises:
   a tubular portion having a first cross-sectional area;
   a lens disposed inside of the tubular portion and configured to allow the optical signals to pass through itself; and
   the flange portion disposed at an end of the tubular portion, the flange portion having:
      a second cross-sectional area greater than the first cross-sectional area; and
      a proximal side facing in a direction of an extension of the tubular portion away from the flange portion, the proximal side being welded to the rim within the optical opening.

3. The OSA box of claim 2, wherein the optical opening is sized such that the tubular portion of the TO-can assembly cap fits inside the optical opening and such that the flange portion of the TO-can assembly cap does not fit inside the optical opening.

4. The OSA box of claim 1, wherein the TO-can assembly cap comprises:
   a tubular portion having a first cross-sectional area;
   a lens disposed inside of the tubular portion and configured to allow the optical signals to pass through it; and
   the flange portion disposed at an end of the tubular portion, the flange portion having:
      a second cross-sectional area greater than the first cross-sectional area;
      a proximal side facing in a direction of an extension of the tubular portion away from the flange portion; and
      a distal side opposite the proximal side and welded to the rim within the optical opening.

5. The OSA box of claim 1, wherein the rim is an inside rim that faces inside of the OSA box.

6. The OSA box of claim 1, wherein the rim faces outside of the OSA box.

7. The OSA box of claim 1, wherein the TO-can assembly cap is welded to the rim using resistive welding or laser welding.

8. A transistor-outline can (TO-can) assembly cap comprising:
   a tubular portion having a first cross-sectional area;
   a lens disposed inside of the tubular portion; and
   a flange portion disposed at an end of the tubular portion, the flange portion having:
      a second cross-sectional area greater than the first cross-sectional area; and
      a proximal side facing in a direction of an extension of the tubular portion away from the flange portion, the proximal side of the flange portion including a welding concentrator such that the proximal side is configured to be welded on the proximal side to a surface.

9. The TO-can assembly cap of claim 8, wherein:
   the first cross-sectional area of the tubular portion is sized based on an optical opening of an optical subassembly (OSA) box such that the tubular portion is configured to fit inside of the optical opening, the OSA box being configured to include components of a transmitting optical subassembly (TOSA) or a receiving optical subassembly (ROSA); and
   the second cross-sectional area of the flange portion is sized based on the optical opening of the OSA box such that the flange portion is configured to be too big to fit inside of or pass through the optical opening of the OSA box.

10. The TO-can assembly cap of claim 9, wherein the second cross-sectional area of the flange portion is sized based on a rim of the optical opening of the OSA box such that the flange portion is configured to be welded to the rim.

11. The TO-can assembly cap of claim 8, wherein the welding concentrator is configured such that welding the proximal side to the surface creates a hermetic seal.

12. A method comprising:
   selecting a transistor-outline can (TO-can) assembly cap including a flange portion;
   at least partially recessing the TO-can assembly within a rim within an optical opening of an optical subassembly (OSA); and
   welding the flange portion of the TO-can assembly cap to the rim such that the TO-can assembly cap hermetically seals the optical opening and allows optical signals of at least some wavelengths to pass through the TO-can assembly cap and the optical opening.

13. The method of claim 12, wherein:
   the TO-can assembly cap includes:

a tubular portion having a first cross-sectional area;
a lens disposed inside of the tubular portion; and
a flange portion disposed at an end of the tubular portion, the flange portion having:
a second cross-sectional area greater than the first cross-sectional area; and
a proximal side facing in a direction of an extension of the tubular portion away from the flange portion; and
the method further comprises welding the proximal side to the rim within the optical opening.

14. The method of claim 13, further comprising disposing the tubular portion of the TO-can assembly cap inside the optical opening.

15. The method of claim 12, wherein:
the TO-can assembly cap includes:
a tubular portion having a first cross-sectional area;
a lens disposed inside of the tubular portion; and
a flange portion disposed at an end of the tubular portion, the flange portion having:
a second cross-sectional area greater than the first cross-sectional area;
a proximal side facing in a direction of an extension of the tubular portion away from the flange portion; and
a distal side opposite the proximal side; and
the method further comprises welding the distal side to the rim within the optical opening.

16. The method of claim 15, further comprising disposing the tubular portion of the TO-can assembly cap inside the optical opening.

17. The method of claim 12, wherein the rim is an outside rim that faces outside of the OSA box.

18. The method of claim 12, wherein the rim is an inside rim that faces inside of the OSA box.

19. The method of claim 12, further comprising welding the TO-can assembly cap to the rim using resistive welding or laser welding.

\* \* \* \* \*